(12) United States Patent
Okamoto et al.

(10) Patent No.: US 7,961,223 B2
(45) Date of Patent: Jun. 14, 2011

(54) IMAGE SENSOR FOR SURPRESSING MOVEMENT OF AN IMAGE SENSOR DUE TO CHANGE IN URGING DIRECTION OF A SPRING

(75) Inventors: Daisuke Okamoto, Daito (JP); Hisao Kai, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 384 days.

(21) Appl. No.: 12/273,832

(22) Filed: Nov. 19, 2008

(65) Prior Publication Data
US 2009/0128673 A1 May 21, 2009

(30) Foreign Application Priority Data
Nov. 20, 2007 (JP) ................................. 2007-300924

(51) Int. Cl.
*H04N 5/228* (2006.01)
*H04N 5/225* (2006.01)
*G03B 17/00* (2006.01)
(52) U.S. Cl. ........................ 348/208.7; 348/374; 396/55
(58) Field of Classification Search ............. 348/208.99, 348/208.4, 208.7, 208.11, 374; 396/55
See application file for complete search history.

(56) References Cited

U.S. PATENT DOCUMENTS

| | | | |
|---|---|---|---|
| 6,397,008 B2 * | 5/2002 | Kuwana et al. | 396/55 |
| 7,536,091 B2 * | 5/2009 | Nomura et al. | 396/55 |
| 7,574,123 B2 * | 8/2009 | Nomura et al. | 396/55 |
| 7,583,891 B2 * | 9/2009 | Hirunuma et al. | 396/55 |
| 7,688,354 B2 * | 3/2010 | Nomura et al. | 348/208.7 |
| 7,773,117 B2 * | 8/2010 | Nomura et al. | 348/208.7 |
| 2007/0003265 A1 | 1/2007 | Nomura et al. | |
| 2007/0014555 A1 | 1/2007 | Hirunuma et al. | |
| 2007/0257989 A1 * | 11/2007 | Shirono | 348/208.99 |
| 2008/0085108 A1 * | 4/2008 | Sekino et al. | 396/55 |
| 2008/0292296 A1 * | 11/2008 | Ryu et al. | 396/55 |
| 2009/0091632 A1 * | 4/2009 | Okamoto et al. | 348/208.7 |
| 2009/0153684 A1 * | 6/2009 | Yoshida et al. | 348/374 |
| 2009/0201399 A1 * | 8/2009 | Senga | 348/374 |
| 2009/0263116 A1 * | 10/2009 | Saito | 396/55 |
| 2010/0002087 A1 * | 1/2010 | Huang et al. | 348/208.4 |
| 2010/0091122 A1 * | 4/2010 | Irisawa et al. | 348/208.7 |
| 2010/0149409 A1 * | 6/2010 | Chiang | 348/374 |
| 2010/0157074 A1 * | 6/2010 | Kawai et al. | 348/208.7 |

FOREIGN PATENT DOCUMENTS

| | | | |
|---|---|---|---|
| JP | 2000-307937 A | | 11/2000 |
| JP | 2001-264840 A | | 9/2001 |
| JP | 2006-343698 A | | 12/2006 |
| JP | 2006343698 A | * | 12/2006 |
| JP | 2007-25180 A | | 2/2007 |
| JP | 2007-128016 A | | 5/2007 |
| JP | 2008292880 A | * | 12/2008 |
| JP | 2009086472 A | * | 4/2009 |

* cited by examiner

*Primary Examiner* — John M Villecco
(74) *Attorney, Agent, or Firm* — Crowell & Moring LLP

(57) ABSTRACT

In this image sensor, a first spring member is so arranged that the urging direction of the first spring member is inclined with respect to the axis of a first rotating shaft of a first driving source thereby inclining a transmission member urged by the first spring member with respect to the axis of the first rotating shaft and bringing the transmission member into contact with a first pressing member engaging with the first rotating shaft, so that the first pressing member engages with the first rotating shaft while the axis of the first pressing member is inclined with respect to the axis of the first rotating shaft.

19 Claims, 9 Drawing Sheets

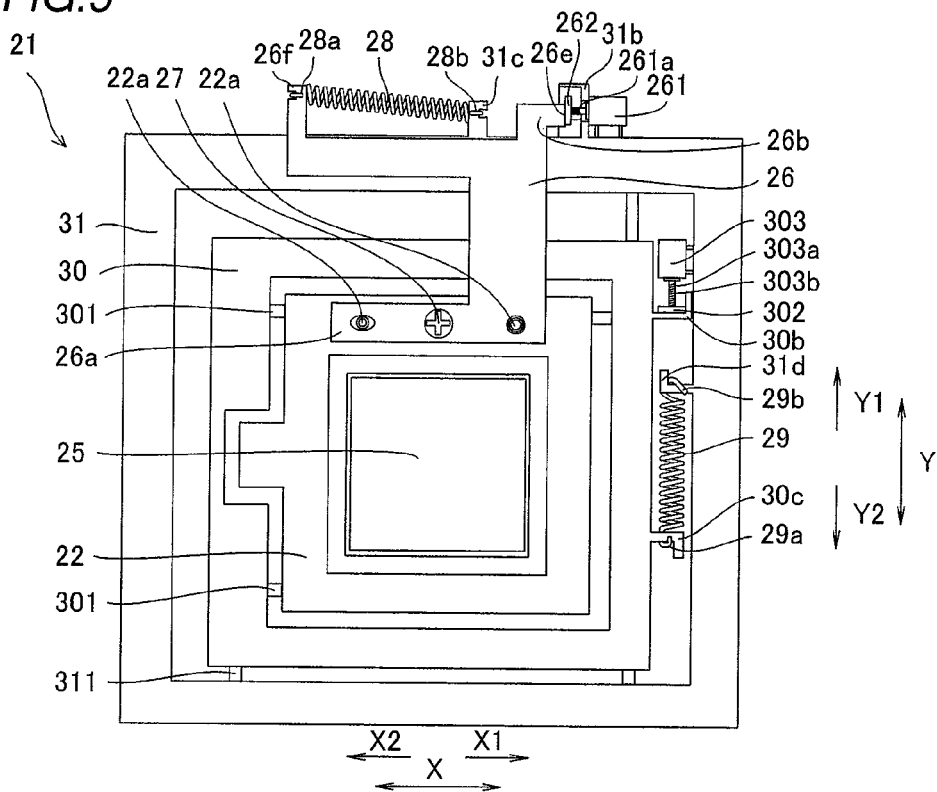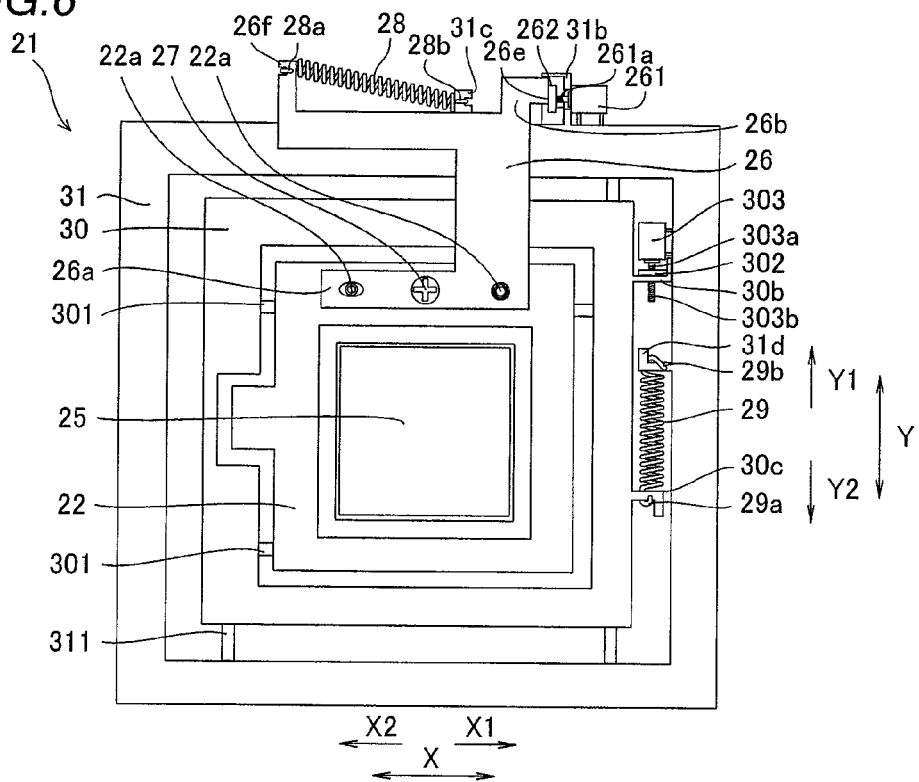

IMAGE SENSOR FOR SURPRESSING MOVEMENT OF AN IMAGE SENSOR DUE TO CHANGE IN URGING DIRECTION OF A SPRING

BACKGROUND OF THE INVENTION

1. Field of the Invention

The present invention relates to an image sensor, and more particularly, it relates to an image sensor comprising an imaging element.

2. Description of the Background Art

An image sensor comprising an imaging element is known in general, as disclosed in each of Japanese Patent Laying-Open Nos. 2007-128016, 2007-025180, 2000-307937, 2001-264840 and 2006-343698, for example.

The aforementioned Japanese Patent Laying-Open No. 2007-128016 discloses a corrector comprising a CCD (imaging element), an X stage (movable member) for mounting the CCD, a driving source (driving source) having a rotating shaft provided with a screw portion for moving the X stage, a nut (pressing member) having a screw portion and a spring member parallelly mounted on the rotating shaft for urging the X stage. This corrector is so formed that the screw portion of the rotating shaft of the driving source and the screw portion of the nut engage with each other. Further, the corrector is so formed that the X stage moves in a first direction while a Y stage moves in a second direction orthogonal to the first direction. In addition, the corrector is so formed that the X stage moves in the second direction following the movement of the Y stage in the second direction.

The aforementioned Japanese Patent Laying-Open No. 2007-025180 discloses a stage unit comprising an imaging element, a storing/holding portion (movable member) for storing the imaging element, a plate spring (spring member) mounted on a frame of the storing/holding portion for moving the storing/holding portion, a coil (driving source) for generating driving force and a magnetic force generator for generating magnetic force. This stage unit is so formed as to generate the driving force in the coil by the magnetic force generated in the magnetic force generator and deflecting the plate spring thereby moving the storing/holding portion in a first direction and a second direction orthogonal to the first direction.

The aforementioned Japanese Patent Laying-Open No. 2000-307937 discloses an image sensor comprising an imaging element, a substrate (movable member) for mounting the imaging element, a piezoelectric element (driving source) for generating driving force and a plate spring (spring member) mounted on the piezoelectric element to be parallel to the substrate for coming into contact with the substrate. This image sensor is so formed as to deflect the plate spring by expanding/contracting the piezoelectric element thereby moving the substrate mounted with the imaging element in a first direction and a second direction orthogonal to the first direction.

The aforementioned Japanese Patent Laying-Open No. 2001-264840 discloses an optical device comprising a correction lens serving also as an imaging element, a support frame (movable member) for supporting the correction lens, a base plate for mounting the support frame, a yoke for generating magnetic force, a coil (driving source) for generating driving force and a spring member for regulating movement. In this optical device, the support frame is arranged in the base plate, while the support frame and the base plate are coupled with each other by the spring member. Movement of the support frame is regulated by the spring member in the base plate. The yoke is mounted on the support frame, and the optical device is so formed as to move the support frame in a first direction and a second direction orthogonal to the first direction due to the driving force generated in the coil.

The aforementioned Japanese Patent Laying-Open No. 2006-343698 discloses an image sensor comprising an imaging unit mounted with an imaging element, a frame (movable member) for mounting the imaging unit, an actuator (driving source) having a drive shaft (pressing member) and a spring member. This image sensor is so formed as to move the frame in a first direction and a second direction orthogonal to the first direction by driving the drive shaft of the actuator. The spring member is mounted on the drive shaft, to urge the frame.

In the corrector according to the aforementioned Japanese Patent Laying-Open No. 2007-128016 in which the screw portions of the rotating shaft of the driving source and the nut engage with each other, however, a backlash (clearance) is generally present between the screw portions. Further, the urging direction of the spring member changes when the X stage moving in the first direction moves in the second direction orthogonal to the first direction due to the movement of the Y stage. When the urging direction of the spring member changes, the quantity of movement of the nut may conceivably change by the backlash between the screw portions of the rotating shaft and the nut. In this case, therefore, the quantity of movement of the imaging element may disadvantageously change.

In the stage unit according to the aforementioned Japanese Patent Laying-Open No. 2007-025180, the plate spring is so deflected as to move the storing/holding portion, and hence the urging direction of the spring in the first direction may conceivably change when the storing/holding portion is moved in the second direction. When the urging direction of the plate spring changes, the quantity of movement of the storing/holding portion may conceivably change. In this case, therefore, the quantity of movement of the imaging element may disadvantageously change.

In the image sensor according to the aforementioned Japanese Patent Laying-Open No. 2000-307937, the plate spring is so deflected as to move the substrate, and hence the urging direction of the plate spring in the first direction may conceivably change when the substrate is moved in the second direction. When the urging direction of the plate spring changes, the quantity of movement of the substrate (imaging element) may disadvantageously change.

In the optical device according to the aforementioned Japanese Patent Laying-Open No. 2001-264840, the urging direction of the spring member in the first direction may conceivably change when the support frame is moved in the second direction. When the urging direction of the spring member changes, the quantity of movement of the support frame (imaging element) may disadvantageously change.

In the image sensor according to the aforementioned Japanese Patent Laying-Open No. 2006-343698, the urging direction of the spring member in the first direction may conceivably change when the imaging unit is moved in the second direction. When the urging direction of the spring member changes, the quantity of movement of the imaging unit (imaging element) may disadvantageously change.

SUMMARY OF THE INVENTION

The present invention has been proposed in order to solve the aforementioned problems, and an object of the present invention is to provide an image sensor capable of suppressing change in the quantity of movement of an imaging element resulting from change in an urging direction of a spring member.

An image sensor according to an aspect of the present invention comprises an imaging element for imaging an object, a first movable member mounted with the imaging element and movable in a first direction and a second direction orthogonal to the first direction, a transmission member provided on the first movable member, a first driving source having a first rotating shaft for supplying driving force to the transmission member, a first pressing member so provided as to engage with the first rotating shaft for pressing the transmission member in the first direction and a first spring member for urging the transmission member in the first direction on the side of the first pressing member, and the first spring member is so arranged that the urging direction of the first spring member is inclined with respect to the axis of the first rotating shaft of the first driving source thereby inclining the transmission member urged by the first spring member with respect to the axis of the first rotating shaft and bringing the transmission member into contact with the first pressing member engaging with the first rotating shaft, so that the first pressing member engages with the first rotating shaft while the axis of the first pressing member is inclined with respect to the axis of the first rotating shaft.

In the image sensor according to this aspect, as hereinabove described, the first spring member is so arranged that the urging direction of the first spring member is inclined with respect to the axis of the first rotating shaft of the first driving source, whereby the urging direction of the first spring member can be inhibited from changing between the state inclined with respect to the axis of the first rotating shaft of the first driving source and a state parallel thereto due to movement of the first movable member in the second direction orthogonal to the first direction. Thus, the engaging position between the first rotating shaft and the first pressing member can be inhibited from moving by a backlash due to change of the urging direction of the first spring member between the state inclined with respect to the axis of the first rotating shaft of the first driving source and the state parallel thereto. Consequently, the quantity of movement of the first movable member (imaging element) can be inhibited from changing due to movement of the engaging position between the first rotating shaft and the first pressing member resulting from the backlash.

In the image sensor according to the aforementioned aspect, the first spring member is preferably so arranged that the urging direction of the first spring member is inclined on the same side with respect to the axis of the first rotating shaft of the first driving source in the overall range of movement of the first movable member in the second direction. According to this structure, the urging direction of the first spring member can be inhibited from inclination toward a different side with respect to the axis of the first rotating shaft of the first driving source also when the same changes due to movement of the first movable member in the second direction orthogonal to the first direction. Thus, the engaging position between the first rotating shaft and the first pressing member can be inhibited from moving by the backlash due to change of the urging direction of the first spring member to a state inclined toward a different side with respect to the axis of the first rotating shaft of the first driving source. Consequently, the quantity of movement of the first movable member (imaging element) can be inhibited from changing due to movement of the engaging position between the first rotating shaft and the first pressing member resulting from the backlash.

In this case, a first mounting position of the first spring member is preferably located outside a second mounting position of the first spring member in the second direction. According to this structure, the first spring member can be mounted between the first and second mounting positions thereof in the inclined state.

In the aforementioned image sensor having the first spring member so arranged that the urging direction thereof is inclined on the same side with respect to the axis of the first rotating shaft of the first driving source, the angle of inclination of the transmission member with respect to the axis of the first rotating shaft of the first driving source preferably remains unchanged even if the urging direction of the first spring member changes with respect to the axis of the first rotating shaft of the first driving source following movement of the first movable member in the range of movement of the first movable member in the second direction. According to this structure, the transmission member can be inhibited from inclination toward a different side with respect to the axis of the first rotating shaft of the first driving source also when the urging direction of the first spring member changes due to movement of the first movable member in the second direction.

In this case, the angle of inclination of the transmission member with respect to the axis of the first rotating shaft of the first driving source is preferably kept constant even if the urging direction of the first spring member is maximally or minimally inclined with respect to the axis of the first rotating shaft of the first driving source following movement of the first movable member in the range of movement of the first movable member in the second direction. According to this structure, the transmission member can be inhibited from inclination toward a different side with respect to the axis of the first rotating shaft of the first driving source also when the urging direction of the first spring member maximally or minimally changes due to movement of the first movable member in the second direction.

In the aforementioned image sensor having the first movable member moving in the second direction, the angle of inclination of the axis of the first pressing member with respect to the axis of the first rotating shaft of the first driving source is preferably rendered substantially identical in the overall range of movement of the first movable member in the second direction. According to this structure, the engaging position between the first rotating shaft and the first pressing member can be rendered regularly constant in the overall range of movement of the first movable member in the second direction, whereby the engaging position can be inhibited from movement.

In the aforementioned image sensor having the first spring member so arranged that the urging direction thereof is inclined on the same side with respect to the axis of the first rotating shaft of the first driving source, the angle of inclination of the urging direction of the first spring member with respect to the axis of the first rotating shaft preferably reaches an intermediate level between an angle of maximum inclination and an angle of minimum inclination on an intermediate position of the range of movement of the first movable member in the second direction, and the intermediate position is preferably set on the home position of the first movable portion with respect to the second direction. According to this structure, the first spring member can be inhibited from inclination toward a different side with respect to the axis of the first rotating shaft of the first driving source also when the urging direction of the first spring member changes due to movement of the first movable member in the second direction orthogonal to the first direction while the first movable member is arranged on the home position.

In the aforementioned image sensor having the first spring member so arranged that the urging direction thereof is inclined on the same side with respect to the axis of the first rotating shaft of the first driving source, the transmission member preferably includes a first mounting portion for mounting a first side of the first spring member, the image sensor preferably further comprises a fixed member including a second mounting portion for mounting a second side of the first spring member, and the first mounting portion of the transmission member is preferably located outside the second mounting portion of the fixed member in the second direction, thereby arranging the first spring member so that the urging direction of the first spring member is inclined on the same side with respect to the axis of the first rotating shaft of the first driving source in the range of movement of the first movable member in the second direction. According to this structure, the first spring member can be mounted between the first mounting portion of the transmission member and the second mounting portion of the fixed member in an inclined state, whereby the transmission member can be inhibited from inclination toward a different side with respect to the axis of the first rotating shaft of the first driving source also when the urging direction of the first spring member changes due to movement of the first movable member in the second direction.

In this case, the first mounting portion of the transmission member is preferably arranged on a side opposite to the first driving source with respect to the second mounting portion of the fixed member, while the first spring member is preferably arranged between the first mounting portion of the transmission member and the second mounting portion of the fixed member, and so formed as to urge the transmission member toward the first driving source. According to this structure, the first spring member can be mounted between the first mounting portion of the transmission member and the second mounting portion of the fixed member in the inclined state by locating the first mounting portion of the transmission member outside the second mounting portion of the fixed member in the second direction in the range of movement of the first movable member in the second direction, for example.

The image sensor according to the aforementioned aspect preferably further comprises a second movable member for moving the first movable member in the second direction and a second driving source for moving the second movable member in the second direction, the first pressing member preferably includes a nut member having a first screw portion on the inner periphery thereof, the first rotating shaft of the first driving source preferably has a second screw portion on the outer periphery thereof, and the first spring member is preferably so arranged that the urging direction of the first spring member is inclined with respect to the axis of the first rotating shaft of the first driving shaft in the range of movement of the first movable member in the second direction following movement of the second movable member in the second direction thereby inclining the transmission member urged by the first spring member with respect to the axis of the first rotating shaft and bringing the transmission member into contact with the nut member engaging with the first rotating shaft, so that the nut member engages with the first rotating shaft while the axis of the nut member is inclined with respect to the axis of the first rotating shaft and the first screw portion of the nut member comes into contact with the second screw portion of the first rotating shaft. According to this structure, the urging direction of the first spring member can be inhibited from changing between the state inclined with respect to the axis of the first rotating shaft of the first driving source and a state parallel thereto due to movement of the first movable member in the second direction orthogonal to the first direction in the range of movement of the first movable member in the second direction following movement of the second movable member in the second direction. Thus, the engaging position between the second screw portion of the first rotating shaft and the first screw portion of the nut member can be inhibited from moving by a backlash due to change of the urging direction of the first spring member between the state inclined with respect to the axis of the first rotating shaft of the first driving source and the state parallel thereto. Consequently, the quantity of movement of the first movable member (imaging element) can be inhibited from changing due to movement of the engaging position between the second screw portion of the first rotating shaft and the first screw portion of the nut member resulting from the backlash.

In this case, the first screw portion of the nut member and the second screw portion of the first rotating shaft preferably include thread portions each having two surfaces respectively, the first surface of the thread portion of the first screw portion of the nut member is preferably so formed as to engage with the first surface of the thread portion of the second screw portion of the first rotating shaft, and the second surface of the thread portion of the first screw portion of the nut member is preferably so formed as not to engage with the second surface of the thread portion of the second screw portion of the first rotating shaft but to form a clearance. According to this structure, the engaging position between the thread portion of the first screw portion of the nut member and the thread portion of the second screw portion of the first rotating shaft can be inhibited from moving by the clearance between the thread portion of the first screw portion of the nut member and the thread portion of the second screw portion of the first rotating shaft, whereby the quantity of movement of the first movable member (imaging element) can be inhibited from changing due to movement of the engaging position resulting from the clearance between the thread portion of the first screw portion of the nut member and the thread portion of the second screw portion of the first rotating shaft.

In the aforementioned image sensor comprising the nut member, the transmission member and the nut member are preferably so formed as to come into surface contact with each other in the state inclined with respect to the axis of the first rotating shaft of the first driving source. According to this structure, the urging force of the first spring member applied to the transmission member can be reliably transmitted to the nut member.

In this case, the transmission member is preferably rendered slidable on the surface of the nut member while the transmission member and the nut member are in surface contact with each other in the range of movement of the first movable member in the second direction following movement of the second movable member in the second direction. According to this structure, the transmission member can slidingly move on the surface of the nut member while transmitting the urging force of the first spring member applied to the transmission member reliably to the nut member in the range of movement of the first movable member in the second direction.

In the aforementioned image sensor having the transmission member and the nut member coming into surface contact with each other, the transmission member preferably includes a contact portion, and the contact portion of the transmission member is preferably rendered slidable on the surface of the nut member while the contact portion of the transmission member and the surface of the nut member are in surface contact with each other in the range of movement of the first movable member in the second direction following movement of the second movable member in the second direction. According to this structure, the contact portion of the transmission member can slidingly move on the surface of the nut member while transmitting the urging force of the first spring member applied to the transmission member reliably to the nut member in the range of movement of the first movable member in the second direction.

In this case, the contact portion of the transmission member preferably includes a regulation member regulating the range of movement of the transmission member in the second direction. According to this structure, the range of movement of the transmission member in the second direction can be easily set.

In the aforementioned image sensor having the transmission member and the nut member coming into surface contact with each other, the angle of inclination of the surface contact portion between the transmission member and the nut member with respect to a direction perpendicular to the axis of the first rotating shaft of the first driving source is preferably rendered substantially identical in the range of movement of the first movable member in the second direction following movement of the second movable member in the second direction. According to this structure, the transmission member can slidingly move on the surface of the nut member while the transmission member and the nut member are in surface contact with each other.

In the image sensor according to the aforementioned aspect, the first spring member is preferably arranged in a state inclined clockwise in plan view with respect to the axis of the first rotating shaft of the first driving source in the overall range of movement of the first movable member in the second direction. According to this structure, the transmission member and the nut member can be inclined clockwise in plan view with respect to the axis of the first rotating shaft of the first driving source.

The image sensor according to the aforementioned aspect preferably further comprises a second driving source having a second rotating shaft for supplying driving force to the transmission member, a second pressing member so provided as to engage with the second rotating shaft for pressing the second movable member in the second direction and a second spring member for urging the second movable member in the second direction on the side of the second pressing member, and the urging direction of the second spring member is preferably rendered substantially parallel to the axis of the second rotating shaft of the second driving source without inclination. According to this structure, the second movable member can be moved substantially parallelly to the second rotating shaft of the second driving source.

The image sensor according to the aforementioned aspect is preferably so formed that torque acts on the transmission member and the first pressing member about the intersection between the contact portion between the transmission member and the first pressing member and the axis of the first rotating shaft of the first driving source. According to this structure, the transmission member and the first pressing member can be inclined in the direction of the torque acting thereon with respect to the first rotating shaft of the first driving source.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4 to 6 are plan views showing the imaging portion of the video camera according to the embodiment of the present invention;

DESCRIPTION OF THE PREFERRED EMBODIMENTS

An embodiment of the present invention is now described with reference to the drawings.

First, the structure of a video camera 10 according to the embodiment of the present invention is described with reference to FIGS. 1 to 14. This embodiment of the present invention is applied to the video camera 10, which is an exemplary image sensor.

Figure 1:
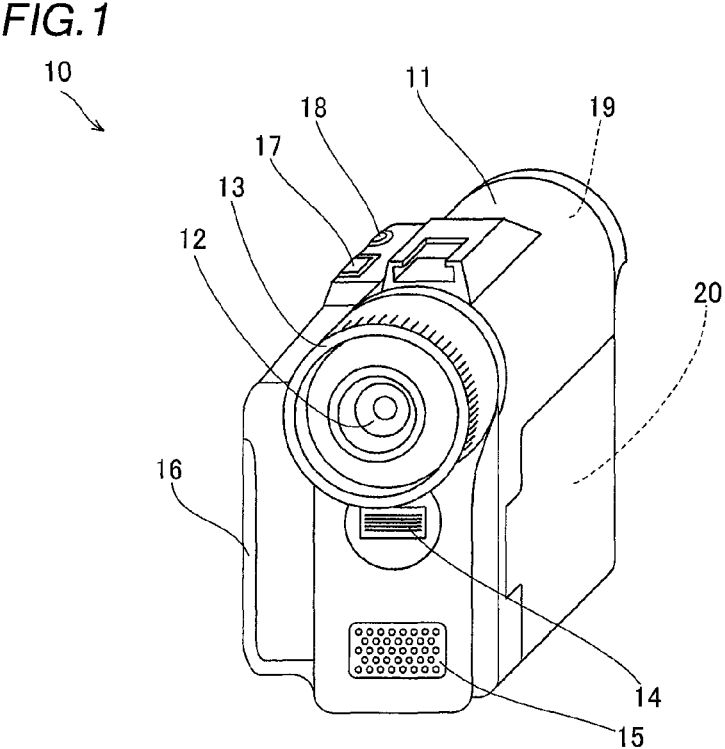
FIG. 1 is a perspective view showing the overall structure of a video camera according to an embodiment of the present invention.
Figure 2:
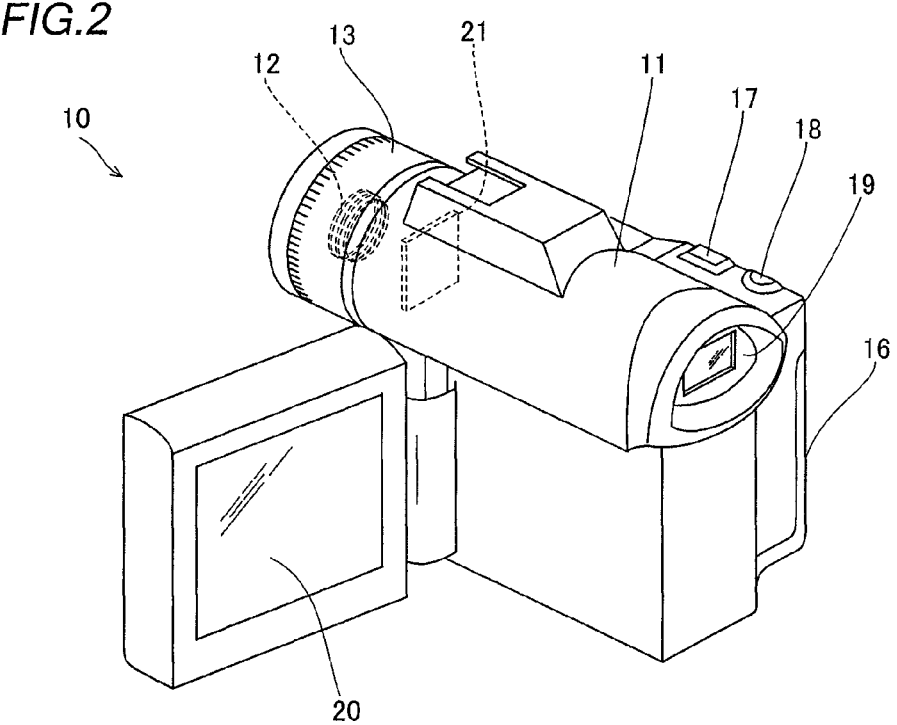
FIG. 2 is another perspective view showing the overall structure of the video camera according to the embodiment of the present invention.

In the video camera 10 according to the embodiment of the present invention, a lens barrel 13 storing a plurality of optical lenses 12 therein, a stroboscope 14, a built-in microphone 15, a video cassette portion 16 on which a video tape (not shown) is detachably mounted, a recording/reproducing button 17 used for recording images, a photo button 18 used for recording still images, a finder 19, a liquid crystal monitor 20 capable of displaying recorded images on a screen and an imaging portion 21 are provided on a housing 11 of resin, as shown in FIGS. 1 and 2.

As shown in FIGS. 1 and 2, the lens barrel 13 storing the plurality of optical lenses 12 therein is so formed as to horizontally project outward from the front surface side of the housing 11. The stroboscope 14 has a function of emitting light as auxiliary light in imaging. The built-in microphone 15 has a function of collecting sounds around an object in imaging (recording). The recording/reproducing button 17 is so pressed by the user in imaging as to start an operation of recording images picked up by the imaging portion 21 of the video camera 10 in the video tape (not shown) and stopping the recording in the video tape (not shown) when the recording is completed. The photo button 18 is so pressed by the user in imaging as to record images currently picked up by the imaging portion 21 as still images. The liquid crystal monitor 20 openable from the finder 19 and the housing 11 in a closable manner is so formed that the user can decide the range of imaging while observing the object through either one or both of the finder 19 and the liquid crystal monitor 20.

According to this embodiment, the imaging portion 21 is constituted of an X-Y stage 22 of resin, a lens member 23 of glass, a packing member 24 of rubber or the like, a CCD 25 for imaging the object, a transmission arm member 26 of a metal (sheet metal), a screw 27, springs 28 and 29, a Y stage 30 of resin and a fixed member 31 of resin, as shown in FIGS. 3 to 7. The X-Y stage 22 is an example of the "first movable member" in the present invention, the CCD 25 is an example of the "imaging element" in the present invention, and the transmission arm member 26 is an example of the "transmission member" in the present invention. The spring 28 is an example of the "first spring member" in the present invention, the spring 29 is an example of the "second spring member" in the present invention, and the Y stage 30 is an example of the "second movable member" in the present invention.

The X-Y stage 22 is provided with positioning boss portions 22a, a screw mounting hole 22b, a lens member mounting surface 22c, a CCD mounting surface 22d and a shaft receiving hole 22e. The positioning boss portions 22a are so integrally provided on the X-Y stage 22 as to perpendicularly extend upward from the uppermost surface of the X-Y stage 22. Further, each of the positioning boss portions 22a has the so-called tapered shape (truncated conical shape), with the diameter reduced perpendicularly upward from the X-Y stage 22. The screw mounting hole 22b has a circular shape, and is provided with a screw portion on the inner surface thereof. The lens member mounting surface 22c and the CCD mounting surface 22d are so formed that the lens member 23 and the CCD 25 are mounted thereon in contact therewith respectively. The shaft receiving hole 22e is so formed as to receive one of sliding shafts 301 described later. The inner diameter of the shaft receiving hole 22e is rendered slightly larger than the diameter of the corresponding slide shaft 301, so that the shaft receiving hole 22e is slidable on the sliding shaft 301.

Figure 9:
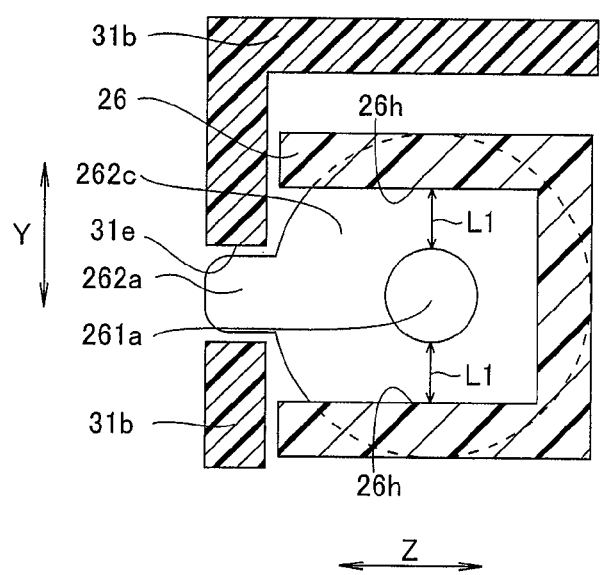
FIG. 9 is a sectional view taken along the line 100-100 in FIG. 4 showing the imaging portion of the video camera according to the embodiment of the present invention.
Figure 10:
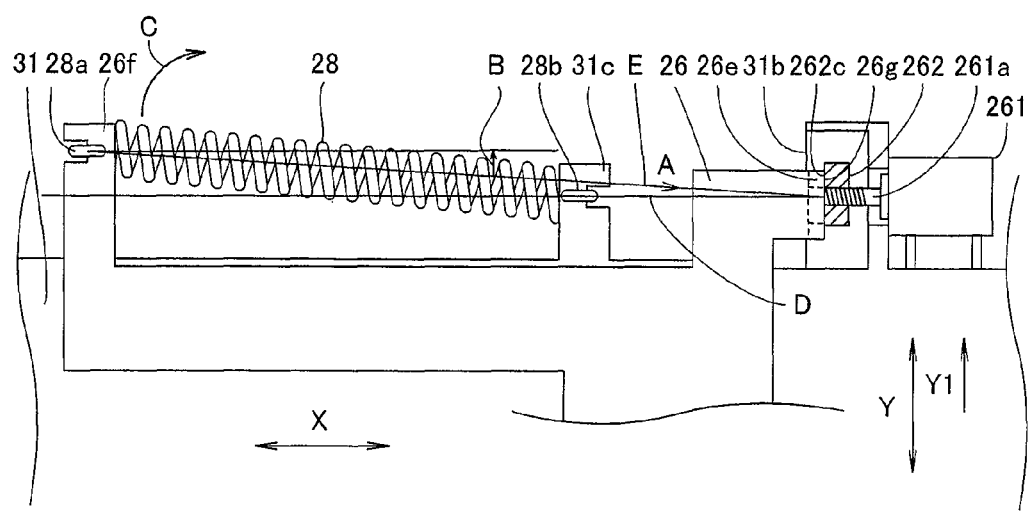
FIGS. 10 to 14 are plan views partially showing the imaging portion of the video camera according to the embodiment of the present invention respectively.
Figure 11:
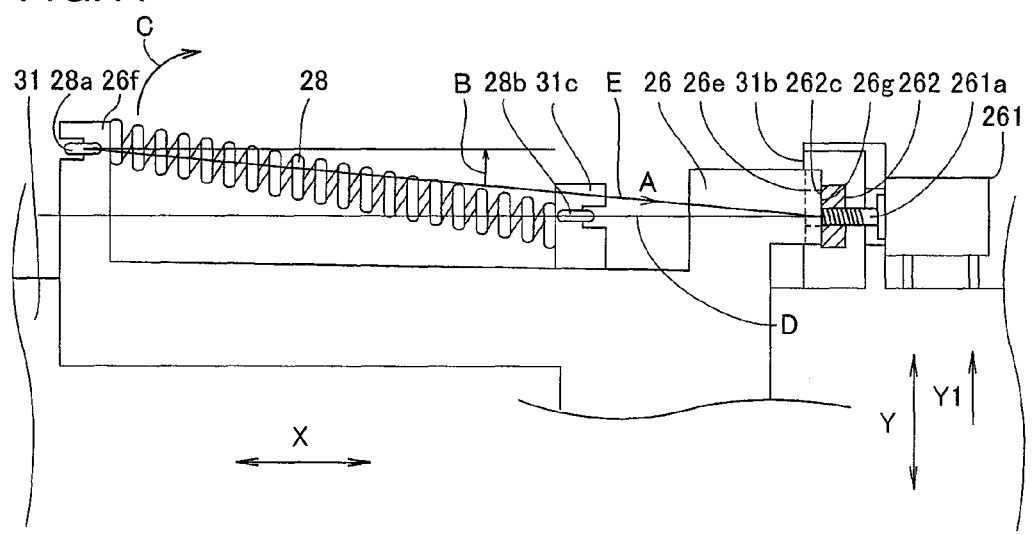

The transmission arm member 26 is provided with a mounting portion 26a, a driving force transmission portion 26b, two positioning holes 26c, a screw receiving hole 26d, a contact portion 26e, a spring mounting portion 26f and a contact surface 26g. The contact portion 26e includes a regulation portion 26h regulating the range of movement of the transmission arm member 26 in a direction Y. As shown in FIG. 9, the transmission arm member 26 is movable in the direction Y in the range of the distance L1 between the regulation portion 26h and a rotating shaft 261a. A stepping motor 261 and a nut 262 are mounted on the transmission arm member 26. The stepping motor 261 is an example of the "first driving source" in the present invention, and the nut 262 is an example of the "first pressing member" or the "nut member" in the present invention.

As shown in FIGS. 3 to 7, the transmission arm member 26 is substantially U-shaped in plan view. The two positioning holes 26c of the transmission arm member 26 are so formed on the mounting portion 26a as to hold the screw receiving hole 26d therebetween. The screw receiving hole 26d has a circular shape, and is formed on the mounting portion 26a.

Figure 7:
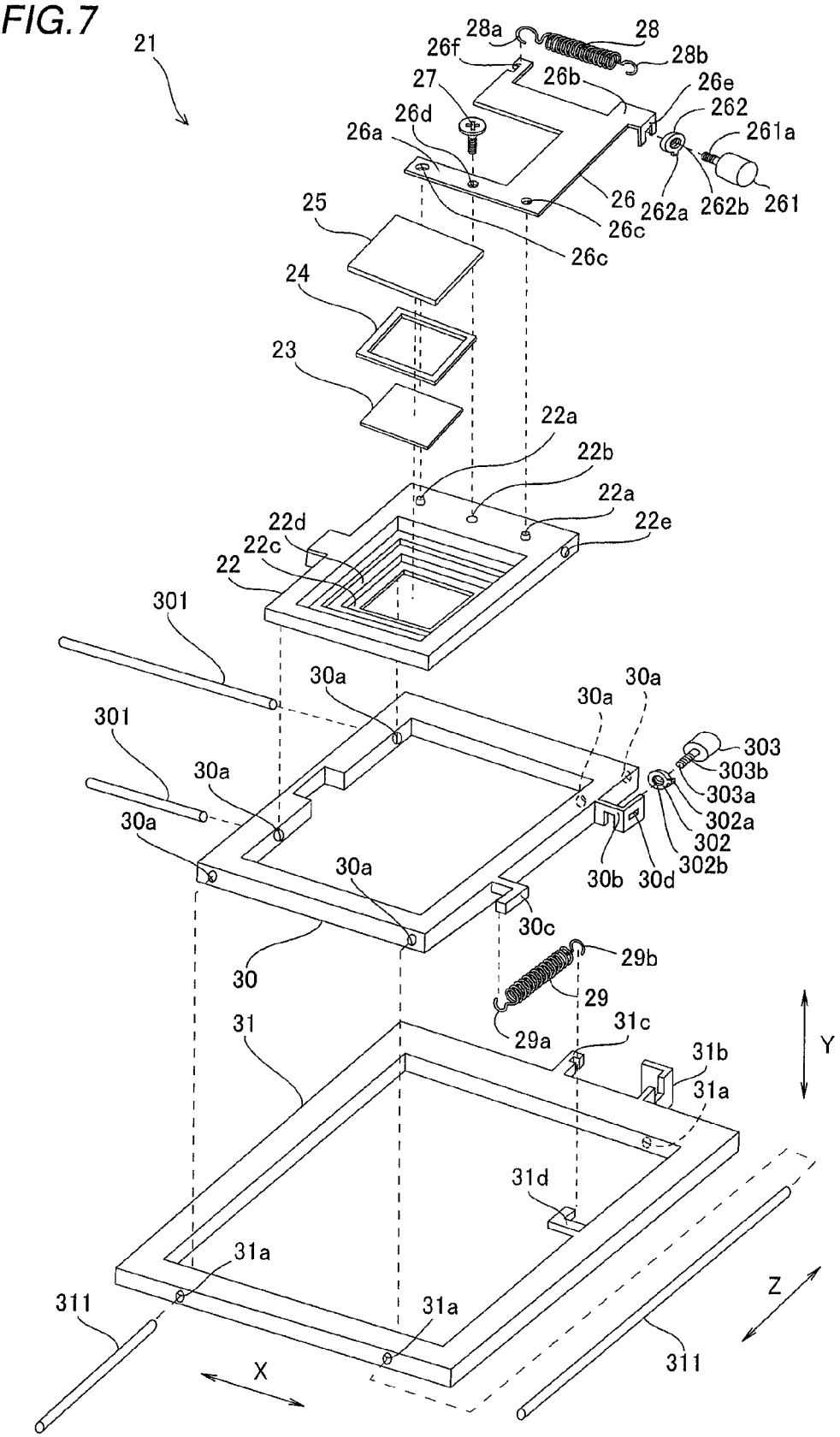
FIG. 7 is an exploded perspective view showing the imaging portion of the video camera according to the embodiment of the present invention.
Figure 8:
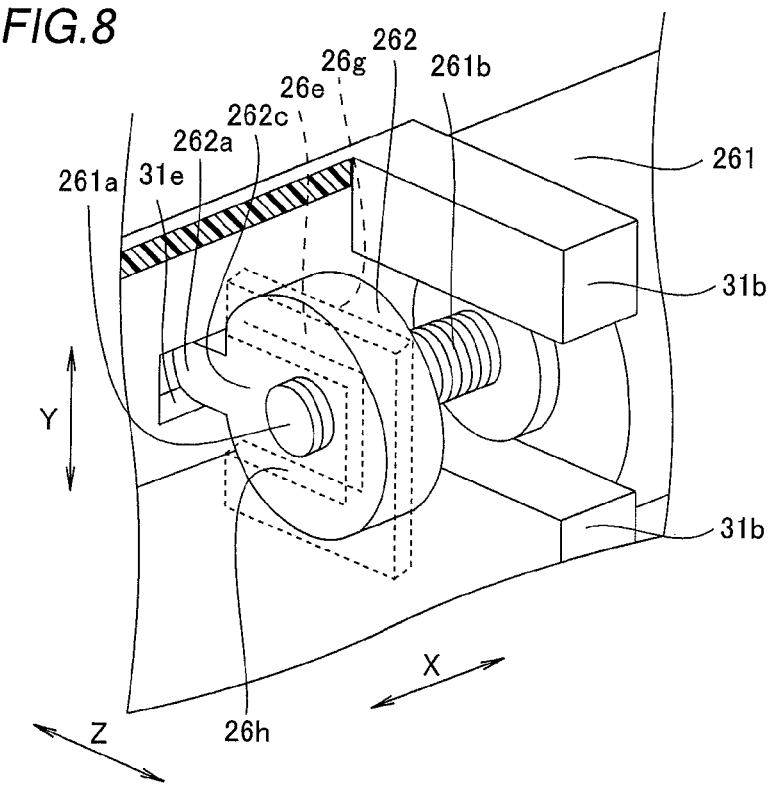
FIG. 8 is a perspective view showing an engaging state between a nut and a rotating shaft of the imaging portion of the video camera according to the embodiment of the present invention.

According to this embodiment, the contact portion 26e of the transmission arm member 26 is so formed on the driving force transmission portion 26b as to perpendicularly extend downward from the back surface of the driving force transmission portion 26b, as shown in FIGS. 7 to 9. Further, the contact portion 26e including the contact surface 26g is recessed in front elevational view, and so formed as to come into surface contact with a contact surface 262c of the nut 262 described later. The stepping motor 261 has the rotating shaft 261a provided with a screw portion 261b on the outer periphery thereof. The screw portion 261b is an example of the "second screw portion" in the present invention, and the rotating shaft 261a is an example of the "first rotating shaft" in the present invention. The screw portion 261b includes thread portions 261c having surfaces 262e and 262f. The nut 262 having a screw portion 262b on the inner surface thereof meshes with the rotating shaft 261a. The screw portion 262b is an example of the "first screw portion" in the present invention. The screw portion 262b includes thread portions 262d having surfaces 262e and 262f. The surfaces 262e of the thread portions 262d of the screw portion 262b of the nut 262 are so formed as to engage with the surfaces 261d of the thread portions 261c of the screw portion 261b of the rotating shaft 261a respectively. On the other hand, the surfaces 262f of the thread portions 262d of the screw portion 262b of the nut 262 are so formed as not to engage with the surfaces 261e of the thread portions 261c of the screw portion 261b of the rotating shaft 261a but to form clearances.

The nut 262 is provided with a projecting portion 262a having a baffling function on a part of the circumference thereof. Further, the nut 262 has the contact surface 262c coming into surface contact with the contact surface 26g of the transmission arm member 26. As shown in FIG. 8, the stepping motor 261 is so formed that the nut 262 is movable along arrow X due to rotation of the rotating shaft 261a. Further, the stepping motor 261 is enabled to press the transmission arm member 26 in contact with the contact surface 262c of the nut 262 along arrow X by moving the nut 262 along arrow X. The X-Y stage 22 is rendered movable along arrow Y, following movement of the transmission arm member 26 along arrow Y.

According to this embodiment, the spring mounting portion 26f is provided on an end opposite to the contact portion 26e of the transmission arm member 26, as shown in FIGS. 3 to 7. This spring mounting portion 26f is in the form of an L-shaped hook in plan view. The screw 27 is fastened into the screw mounting hole 22b of the X-Y stage 22 through the screw receiving hole 26d of the transmission arm member 26. Thus, the transmission arm member 26 is fixed to the X-Y stage 22, to be unmovable. A first end 28a of the spring 28 is mounted on the spring mounting portion 26f. The spring mounting portion 26f is an example of the "first mounting portion" in the present invention. A second end 28b of the spring 28 is mounted on a spring mounting portion 31c of the fixed member 31 described later. The spring mounting portion 31c is an example of the "second mounting portion" in the present invention. A first end 29a of the spring 29 is mounted on another spring mounting portion 31d of the fixed member 31 described later. According to this embodiment, the spring mounting portion 26f of the transmission arm member 26 is positioned beyond the spring mounting portion 31c of the fixed member 31 along arrow Y1. According to this embodiment, the urging direction of the spring 29 is rendered parallel to the axis D of a rotating shaft 303a of a stepping motor 303 without inclination. The rotating shaft 303a is an example of the "second rotating shaft" in the present invention.

According to this embodiment, the spring 28 is mounted in a state inclined along arrow Y1 with respect to the axis D of the rotating shaft 261a of the stepping motor 261, as shown in FIGS. 10 to 14. Thus, urging force A acts on a straight line E connecting the spring mounting portion 26f of the transmission arm member 26 mounted with the spring 28 and the contact portion between the contact surface 26g of the transmission arm member 26 and the contact surface 262c of the nut 262. Further, the spring 28 is so formed that torque B rotating the transmission arm member 26 clockwise along arrow C as a component of the urging force A provided by the spring 28 about the intersection G between the contact portion between the contact surface 26g of the transmission arm member 26 and the contact surface 262c of the nut 262 and the axis D of the rotating shaft 261a of the stepping motor 261. The transmission arm member 26 is inclined by an angle α (about 2.5°) with respect to the axis D of the rotating shaft 261a due to the torque B, whereby the nut 262 in contact with the contact surface 26g of the transmission arm member 26 is also inclined by the same angle α (about 2.5°) with respect to the axis D of the rotating shaft 261a, and the screw portion 262b of the nut 262 is fixed to the screw portion 261b of the rotating shaft 261a in contact therewith. In other words, the transmission arm member 26 and the nut 262 are mounted in the state inclined by the angle α (about 2.5°) with respect to the axis D of the rotating shaft 261a of the stepping motor 261.

Figure 4:
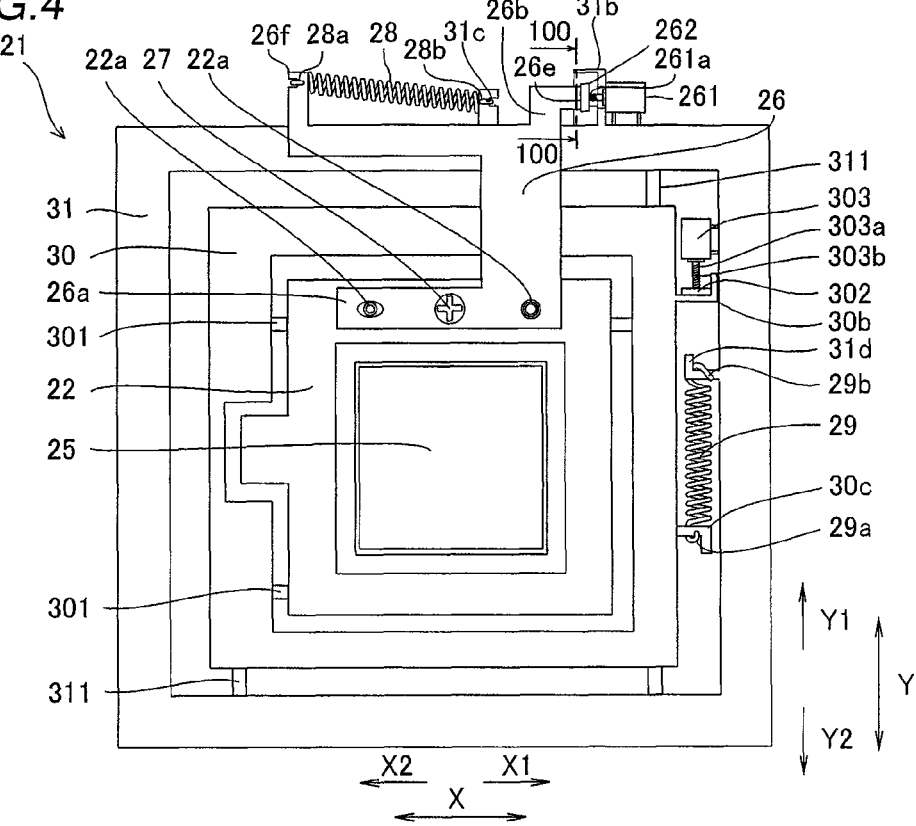

When the X-Y stage 22 moves along arrow Y due to the movement of the Y stage 30 along arrow Y as shown in FIGS. 4 to 6, the contact surface 26g of the transmission arm member 26 in surface contact with the contact surface 262c of the nut 262 moves along arrow Y while sliding on the contact surface 262c of the nut 262, as shown in FIGS. 10 to 14. Also when the transmission arm member 26 moves along arrow Y, the screw portion 262b of the nut 262 and the screw portion 261b of the rotating shaft 261a of the stepping motor 261 are kept engaging with each other on the same engaging position.

The Y stage 30 of resin is provided with six shaft receiving holes 30a, a motor mounting portion 30b, a spring mounting portion 30c and a rectangular opening 30d. Further, the sliding shafts 301, a nut 302 and the stepping motor 303 are mounted on the Y stage 30. The nut 302 is an example of the "second pressing member" in the present invention, and the stepping motor 303 is an example of the "second driving source" in the present invention.

As shown in FIG. 6, the Y stage 30 is in the form of a square frame in plan view. The six shaft receiving holes 30a have circular shapes, and are formed on the side surfaces of the Y stage 30. These shaft receiving holes 30a are so formed as to horizontally extend with respect to the upper surface of the Y stage 30. Four of the columnar sliding shafts 301 are inserted into the corresponding shaft receiving holes 30a respectively.

The motor mounting portion 30b is L-shaped in plan view. Further, this motor mounting portion 30b is recessed in front elevational view. In addition, the motor mounting portion 30b is provided on one of the outer side surfaces of the Y stage 30. The stepping motor 303 has the rotating shaft 303a provided with a screw portion 303b on the outer periphery thereof. A projecting portion 302a having a baffling function is formed on a part of the outer periphery of the nut 302. A screw portion 302b is formed on the inner surface of the nut 302.

The rotating shaft 303a of the stepping motor 303 is mounted on the motor mounting portion 30b in a state meshing with the nut 302. The rectangular opening 30d is formed on the outer side surface of the motor mounting portion 30b. The projecting portion 302a of the nut 302 is so mounted as to engage with the rectangular opening 30d. This projecting portion 302a (see FIG. 7) of the nut 302 is rendered movable in the opening 30d along arrow Z. The spring mounting portion 30c is provided on the same outer side surface of the Y stage 30 provided with the motor mounting portion 30b. This spring mounting portion 30c is in the form of an L-shaped hook in plan view.

The fixed member 31 is provided with three shaft receiving holes 31a, a motor mounting portion 31b, spring mounting portions 31c and 31d and an opening 31e (see FIGS. 8 and 9).

The fixed member 31 is in the form of a square frame in plan view. The shaft receiving holes 31a of the fixed member 31 are so formed as to receive columnar sliding shafts 311 respectively. The aforementioned Y stage 30 is rendered movable along arrow Y along the sliding shafts 311. The three shaft receiving holes 31a have circular shapes, and are formed on the side surfaces of the fixed member 31. The three shaft receiving holes 31 are so formed as to horizontally extend with respect to the upper surface of the fixed member 31.

The motor mounting portion 31b is L-shaped in plan view. The aforementioned stepping motor 261 is mounted on the motor mounting portion 31b. The opening 31e is rectangular in plan view. The projecting portion 262a of the nut 262 engages with the opening 31e. The projecting portion 262a engaging with the opening 31e is rendered movable along arrow X. The spring mounting portion 31c is so provided as to protrude outward from the outer side surface of the fixed member 31. The spring mounting portion 31c is in the form of an L-shaped hook in plan view. This spring mounting portion 31c is provided on the same surface as that of the fixed member 31 provided with the motor mounting portion 31b. The spring mounting portion 31d is in the form of an L-shaped hook in plan view, and so provided as to protrude inward from the inner side surface of the fixed member 31.

Figure 12:
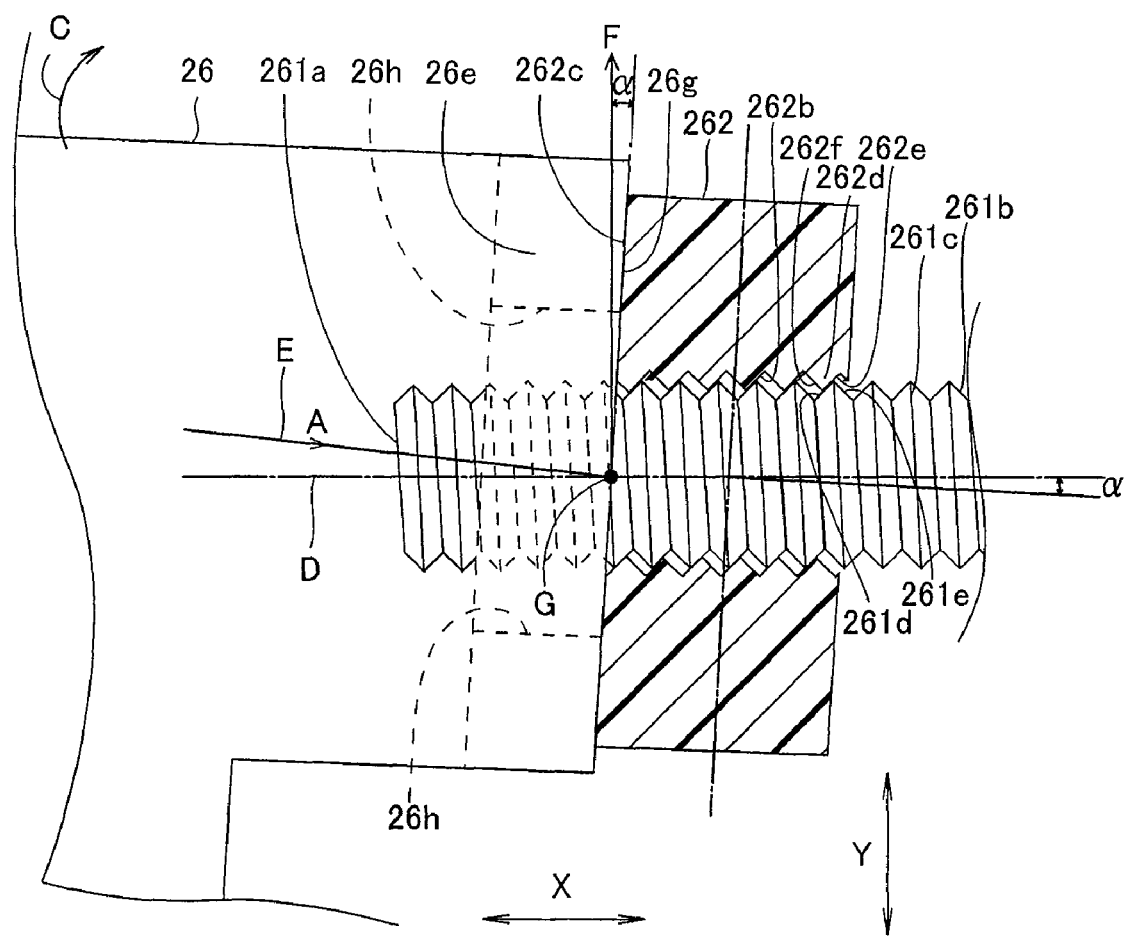
Figure 13:
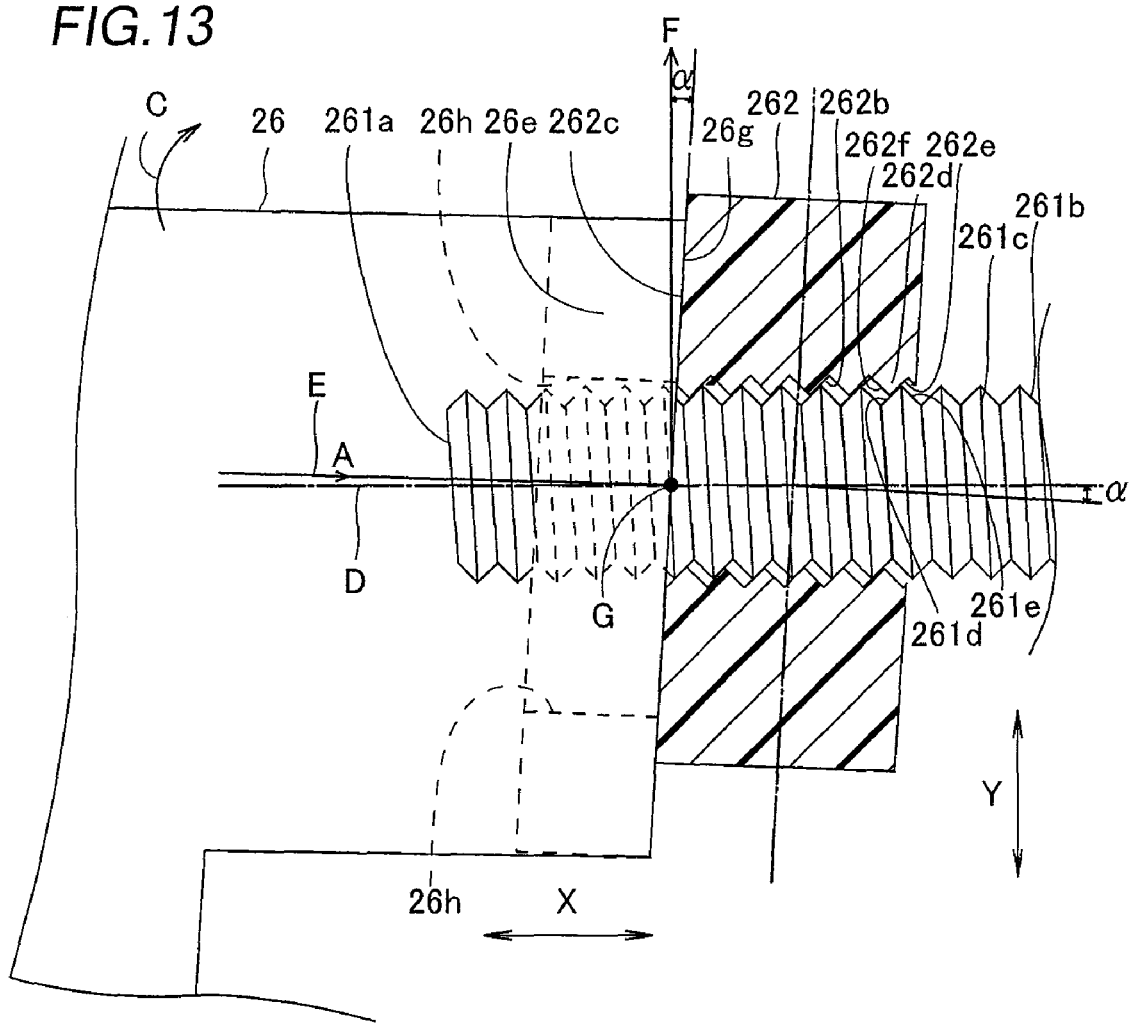
Figure 14:
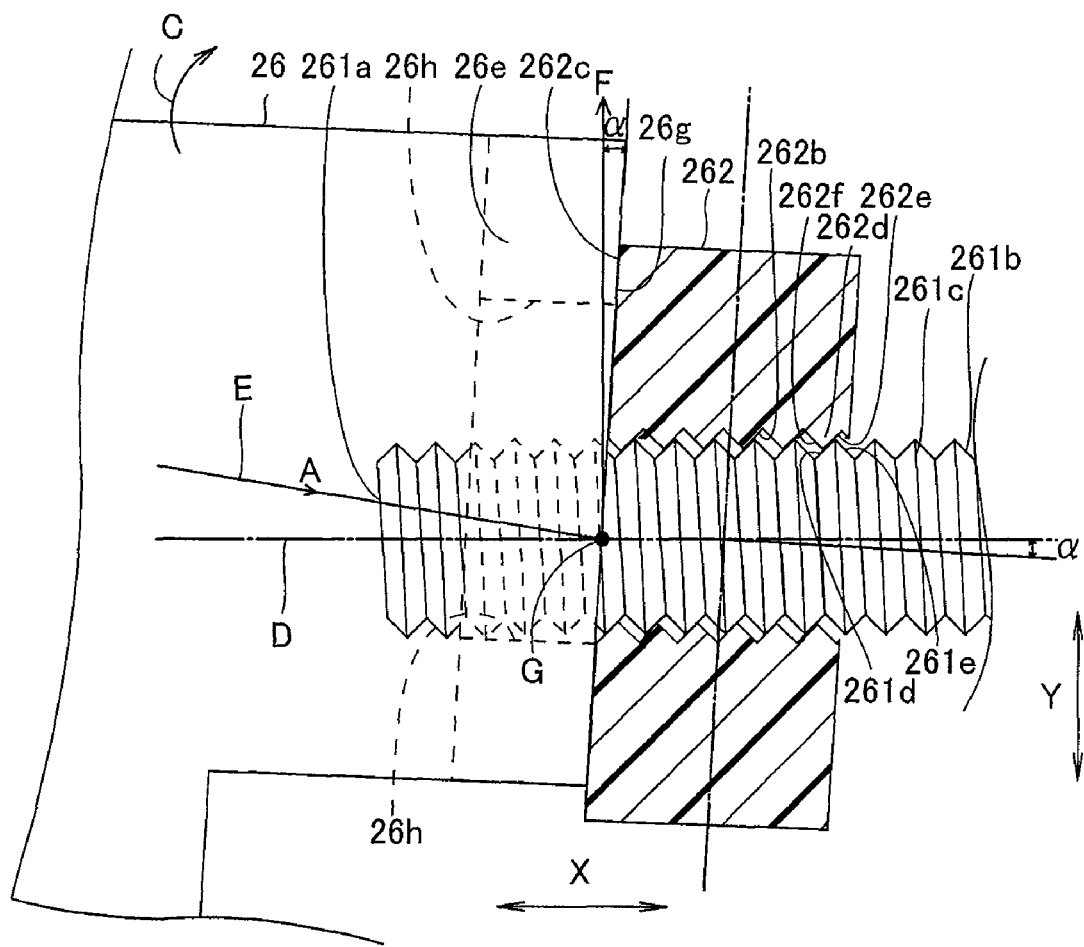

According to this embodiment, the angle α of inclination of the transmission arm member 26 with respect to the axis D of the rotating shaft 261a of the stepping motor 261 is kept constant also when the urging direction E of the spring 28 is maximally inclined (see FIG. 14) or minimally inclined (see FIG. 13) with respect to the axis D of the rotating shaft 261a of the stepping motor 261 following movement of the X-Y stage 22 in the range of movement of the X-Y stage 22 in the direction Y, as shown in FIGS. 12 to 14.

According to this embodiment, the angle of inclination of the urging direction E of the spring 28 with respect to the axis D of the rotating shaft 261a reaches an intermediate level between the angle of maximum inclination (see FIG. 14) and the angle of minimum inclination (see FIG. 13) on an intermediate position of the range of movement of the X-Y stage 22 in the direction Y, and the intermediate position is set on the home position of the X-Y stage 22 with respect to the direction Y, as shown in FIG. 12.

According to this embodiment, the angle α of inclination of the surface contact portion between the transmission arm member 26 and the nut 262 with respect to a direction F perpendicular to the axis D of the rotating shaft 261a of the stepping motor 261 is rendered identical in the range of movement of the X-Y stage 22 in the direction Y following movement of the Y stage 30 in the direction Y, as shown in FIGS. 12 to 14.

Operations of the imaging portion 21 of the video camera 10 according to the embodiment of the present invention are now described with reference to FIGS. 3, 4 and 8 to 14.

Figure 3:
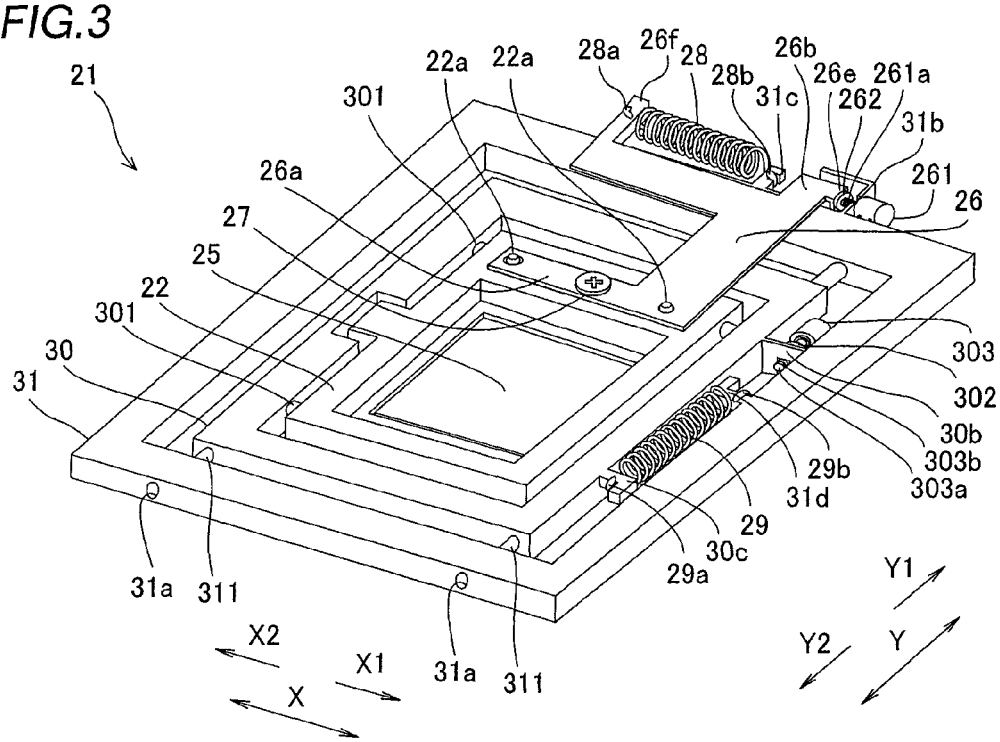
FIG. 3 is a perspective view showing an imaging portion of the video camera according to the embodiment of the present invention.

As to the transmission arm member 26, the rotating shaft 261a of the stepping motor 261 so rotates clockwise that the nut 262 meshing with the rotating shaft 261a linearly moves along arrow X2 against the urging force of the spring 28, as shown in FIGS. 3 and 4. On the other hand, the rotating shaft 261a so rotates anticlockwise that the nut 262 meshing with the rotating shaft 261a linearly moves along arrow X1 due to the urging force of the spring 28.

As to the Y stage 30, the rotating shaft 303a of the stepping motor 303 so rotates clockwise that the nut 302 meshing with the rotating shaft 303a linearly moves along arrow Y2 against the urging force of the spring 29. On the other hand, the rotating shaft 303a so rotates anticlockwise that the nut 302 meshing with the rotating shaft 303a linearly moves along arrow Y1 due to the urging force of the spring 29.

According to this embodiment, as hereinabove described, the spring 28 is so arranged that the urging direction E thereof is inclined with respect to the axis D of the rotating shaft 261a of the stepping motor 261, whereby the urging direction E of the spring 28 can be inhibited from changing between the state inclined with respect to the axis D of the rotating shaft 261a of the stepping motor 261 and a state parallel thereto due to movement of the X-Y stage 22 in the direction Y orthogonal to the direction X. Thus, the engaging position between the rotating shaft 261a and the nut 262 can be inhibited from moving by a backlash due to change of the urging direction E of the spring 28 between the state inclined with respect to the axis D of the rotating shaft 261a of the stepping motor 261 and the state parallel thereto. Consequently, the quantity of movement of the X-Y stage 22 (CCD 25) can be inhibited from changing due to movement of the engaging position between the rotating shaft 261a and the nut 262 resulting from the backlash.

According to this embodiment, as hereinabove described, the spring 28 is so arranged that the urging direction E thereof is inclined on the same side with respect to the axis D of the rotating shaft 261a of the stepping motor 261 in the overall range of movement of the X-Y stage 22 in the direction Y, whereby the urging direction E of the spring 28 can be inhibited from inclination toward a different side with respect to the axis D of the rotating shaft 261a of the stepping motor 261 also when the urging direction E of the spring 28 changes due to movement of the X-Y stage 22 in the direction Y orthogonal to the direction X. Thus, the engaging position between the rotating shaft 261a and the nut 262 can be inhibited from moving by the backlash due to change of the urging direction E of the spring 28 to a state inclined toward a different side with respect to the axis D of the rotating shaft 261a of the stepping motor 261. Consequently, the quantity of movement of the X-Y stage 22 (CCD 25) can be inhibited from changing due to movement of the engaging position between the rotating shaft 261a and the nut 262 resulting from the backlash.

According to this embodiment, as hereinabove described, the mounting position of the first end 28a of the spring 28 is located beyond the mounting position of the second end 28b thereof along arrow Y1, whereby the spring 28 can be mounted in the inclined state between the mounting positions of the first and second ends 28a and 28b thereof.

According to this embodiment, as hereinabove described, the angle α of inclination of the transmission arm member 26 with respect to the axis D of the rotating shaft 261a of the stepping motor 261 is kept constant also when the urging direction E of the spring 28 changes with respect to the axis D of the rotating shaft 261a of the stepping motor 261 following movement of the X-Y stage 22 in the range of movement of the X-Y stage 22 in the direction Y, whereby the transmission arm member 26 can be inhibited from inclination toward a different side with respect to the axis D of the rotating shaft 261a of the stepping motor 261 also when the urging direction E of the spring 28 changes due to movement of the X-Y stage 22 in the direction Y.

According to this embodiment, as hereinabove described, the angle α of inclination of the transmission arm member 26 with respect to the axis D of the rotating shaft 261a of the stepping motor 261 is kept constant also when the urging direction E of the spring 28 is maximally or minimally inclined with respect to the axis D of the rotating shaft 261a of the stepping motor 261 following movement of the X-Y stage 22 in the range of movement of the X-Y stage 22 in the direction Y, whereby the transmission arm member 26 can be inhibited from inclination toward a different side with respect to the axis D of the rotating shaft 261a of the stepping motor 261 also when the urging direction E of the spring 28 maximally or minimally changes due to movement of the X-Y stage 22 in the direction Y.

According to this embodiment, as hereinabove described, the angle α of inclination of the axis D of the nut 262 with respect to the axis D of the rotating shaft 261a of the stepping motor 261 is rendered substantially identical in the overall range of movement of the X-Y stage 22 in the direction Y so that the engaging position between the rotating shaft 261a and the nut 262 can be rendered regularly constant in the overall range of movement of the X-Y stage 22 in the direction Y, whereby the engaging position can be inhibited from movement.

According to this embodiment, as hereinabove described, the angle α of inclination of the urging direction E of the spring 28 with respect to the axis D of the rotating shaft 261a reaches the intermediate level between the angle of maximum inclination and the angle of minimum inclination on the intermediate position of the range of movement of the X-Y stage 22 in the direction Y, while the intermediate position is set on the home position of the X-Y stage 22 with respect to the direction Y, whereby the spring 28 can be inhibited from inclination toward a different side with respect to the axis D of the rotating shaft 261a of the stepping motor 261 also when the urging direction E of the spring 28 changes due to movement of the X-Y stage 22 in the direction Y while the X-Y stage 22 is arranged on the home position.

According to this embodiment, as hereinabove described, the spring mounting portion 26f of the transmission arm member 26 is positioned beyond the spring mounting portion 31c of the fixed member 31 along arrow Y1 so that the spring 28 can be mounted between the spring mounting portion 26f of the transmission arm member 26 and the spring mounting portion 31c of the fixed member 31 in the inclined state by arranging the transmission arm member 26 in the state inclined on the same side with respect to the axis D of the rotating shaft 261a of the stepping motor 261 in the range of movement of the X-Y stage 22 in the direction Y, whereby the transmission arm member 26 can be inhibited from inclination toward a different side with respect to the axis D of the rotating shaft 261a of the stepping motor 261 also when the urging direction E of the spring 28 changes due to movement of the X-Y stage 22 in the direction Y.

According to this embodiment, as hereinabove described, the spring mounting portion 26f of the transmission arm member 26 is arranged on the side opposite to the stepping motor 261 with respect to the spring mounting portion 31c of the fixed member 31 while the spring 28 is arranged between the spring mounting portion 26f of the transmission arm member 26 and the spring mounting portion 31c of the fixed member 31 and so formed as to urge the transmission arm member 26 toward the stepping motor 261, whereby the spring 28 can be mounted between the spring mounting portion 26f of the transmission arm member 26 and the spring mounting portion 31c of the fixed member 31 in the inclined state by positioning the spring mounting portion 26f of the transmission arm member 26 beyond the spring mounting portion 31c of the fixed member 31 along arrow Y1 in the range of movement of the X-Y stage 22 in the direction Y, for example.

According to this embodiment, as hereinabove described, the video camera 10 further comprises the Y stage 30 for moving the X-Y stage 22 in the direction Y and the stepping motor 303 for moving the Y stage 30 in the direction Y, the nut 262 has the screw portion 262b on the inner periphery thereof, the rotating shaft 261a of the stepping motor 261 has the screw portion 261b on the outer periphery thereof, the spring 28 is so arranged that the urging direction E thereof is inclined with respect to the axis D of the rotating shaft 261a of the stepping motor 261 in the range of movement of the X-Y stage 22 in the direction Y following movement of the Y stage 30 in the direction Y thereby inclining the transmission arm member 26 urged by the spring 28 with respect to the axis D of the rotating shaft 261a and bringing the transmission arm member 26 into contact with the nut 262 engaging with the rotating shaft 261*a* so that the nut 262 engages with the rotating shaft 261*a* while the axis D of the nut 262 is inclined with respect to the axis D of the rotating shaft 261*a* and the screw portion 262*b* of the nut 262 comes into contact with the screw portion 261*b* of the rotating shaft 261*a*, whereby the urging direction E of the spring 28 can be inhibited from inclination toward a different side with respect to the axis D of the rotating shaft 261*a* due to movement of the X-Y stage 22 in the direction Y orthogonal to the direction X in the range of movement of the X-Y stage 22 in the direction Y following movement of the Y stage 30 in the direction Y. Thus, the engaging position between the rotating shaft 261*a* and the nut 262 can be inhibited from moving by a backlash due to change of the urging direction E of the spring 28 between the state inclined with respect to the axis D of the rotating shaft 261*a* and the state parallel thereto. Consequently, the quantity of movement of the X-Y stage 22 (CCD 25) can be inhibited from changing due to movement of the engaging position between the rotating shaft 261*a* and the nut 262 resulting from the backlash.

According to this embodiment, the first surfaces 262*e* of the thread portions 262*d* of the screw portion 262*b* of the nut 262 are so formed as to engage with the first surfaces 261*d* of the thread portions 261*c* of the screw portion 261*b* of the rotating shaft 261*a* respectively while the second surfaces 262*f* of the thread portions 262*d* of the screw portion 262*b* of the nut 262 are so formed as not to engage with the second surfaces 261*e* of the thread portions 261*c* of the screw portion 261*b* of the rotating shaft 261*a* but to form clearances so that engaging positions between the thread portions 262*d* of the screw portion 262*b* of the nut 262 and the thread portions 261*c* of the screw portion 261*b* of the rotating shaft 261*a* can be inhibited from moving by backlashes, whereby the quantity of movement of the X-Y stage 22 (CCD 25) can be inhibited from changing due to movement of the engaging positions between the thread portions 262*d* of the screw portion 262*b* of the nut 262 and the thread portions 261*c* of the screw portion 261*b* of the rotating shaft 261*a* resulting from the backlashes.

According to this embodiment, as hereinabove described, the transmission arm member 26 and the nut 262 are so formed as to come into surface contact with each other in the state inclined with respect to the axis D of the rotating shaft 261*a* of the stepping motor 261, whereby the urging force E of the spring 28 applied to the transmission arm member 26 can be reliably transmitted to the nut 262.

According to this embodiment, as hereinabove described, the transmission arm member 26 in surface contact with the nut 262 is rendered slidable on the surface of the nut 262 in the range of movement of the X-Y stage 22 in the direction Y following movement of the Y stage 30 in the direction Y, whereby the transmission arm member 26 can slidingly move on the surface of the nut 262 while transmitting the urging force E of the spring 28 applied thereto reliably to the nut 262 in the range of movement of the X-Y stage 22 in the direction Y.

According to this embodiment, as hereinabove described, the contact portion 26*e* of the transmission arm member 26 in surface contact with the surface of the nut 262 is rendered slidable on the surface of the nut 262 in the range of movement of the X-Y stage 22 in the direction Y following movement of the Y stage 30 in the direction Y, whereby the contact portion 26*e* of the transmission arm member 26 can slidingly move on the surface of the nut 262 while transmitting the urging force E of the spring 28 applied thereto reliably to the nut 262 in the range of movement of the X-Y stage 22 in the direction Y.

According to this embodiment, as hereinabove described, the contact portion 26*e* of the transmission arm member 26 includes the regulation portion 26*h* regulating the range of movement of the transmission arm member 26 in the direction Y, whereby the range of movement of the transmission arm member 26 in the direction Y can be easily set.

According to this embodiment, as hereinabove described, the angle of inclination of the surface contact portion between the transmission arm member 26 and the nut 262 with respect to the direction F perpendicular to the axis D of the rotating shaft 261*a* of the stepping motor 261 is rendered identical in the range of movement of the X-Y stage 22 in the direction Y following movement of the Y stage 30 in the direction Y, whereby the transmission arm member 26 in surface contact with the nut 262 can slidingly move on the surface of the nut 262.

According to this embodiment, as hereinabove described, the spring 28 is arranged in the state inclined clockwise in plan view with respect to the axis D of the rotating shaft 261*a* of the stepping motor 261 in the range of movement of the X-Y stage 22 in the direction Y, whereby the transmission arm member 26 and the nut 262 can be arranged in the state inclined clockwise in plan view with respect to the axis D of the rotating shaft 261*a* of the stepping motor 261.

According to this embodiment, as hereinabove described, the urging direction of the spring 29 is rendered parallel to the axis D of the rotating shaft 303*a* of the stepping motor 303 without inclination, whereby the Y stage 30 can be moved parallelly to the rotating shaft 303*a* of the stepping motor 303.

According to this embodiment, as hereinabove described, the torque B acts on the transmission arm member 26 and the nut 262 about the intersection G between the contact portion between the transmission arm member 26 and the nut 262 and the axis D of the rotating shaft 261*a* of the stepping motor 261, whereby the transmission arm member 26 and the nut 262 can be inclined in the direction of the torque B acting thereon with respect to the axis D of the rotating shaft 261*a* of the stepping motor 261.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment is applied to the video camera employed as an exemplary image sensor according to the present invention, the present invention is not restricted to this but is also applicable to an image sensor other than the video camera.

While the screw portions of the nut and the rotating shaft are shown in the aforementioned embodiment as the examples of the pressing member and the rotating shaft according to the present invention respectively, the present invention is not restricted to this but the pressing member and the rotating shaft may alternatively be formed by other members so far as the axis of the pressing member is inclinable with respect to the axis of the rotating shaft.

While the torque of the spring member is applied clockwise about the contact surface between the contact portion of the transmission arm member and the nut in the aforementioned embodiment, the present invention is not restricted to this but the torque of the spring may alternatively be applied anticlockwise.

What is claimed is:
1. An image sensor comprising:
an imaging element for imaging an object;

a first movable member mounted with said imaging element and movable in a first direction and a second direction orthogonal to said first direction;

a transmission member provided on said first movable member;

a first driving source having a first rotating shaft for supplying driving force to said transmission member;

a first pressing member so provided as to engage with said first rotating shaft for pressing said transmission member in said first direction; and a first spring member for urging said transmission member in said first direction on the side of said first pressing member, wherein said first spring member is so arranged that the urging direction of said first spring member is inclined with respect to the axis of said first rotating shaft of said first driving source thereby inclining said transmission member urged by said first spring member with respect to the axis of said first rotating shaft and bringing said transmission member into contact with said first pressing member engaging with said first rotating shaft, so that said first pressing member engages with said first rotating shaft while the axis of said first pressing member is inclined with respect to the axis of said first rotating shaft.

2. The image sensor according to claim 1, wherein
said first spring member is so arranged that the urging direction of said first spring member is inclined on the same side with respect to the axis of said first rotating shaft of said first driving source in the overall range of movement of said first movable member in said second direction.

3. The image sensor according to claim 2, wherein
a first mounting position of said first spring member is located outside a second mounting position of said first spring member in said second direction.

4. The image sensor according to claim 2, wherein
the angle of inclination of said transmission member with respect to the axis of said first rotating shaft of said first driving source remains unchanged even if the urging direction of said first spring member changes with respect to the axis of said first rotating shaft of said first driving source following movement of said first movable member in the range of movement of said first movable member in said second direction.

5. The image sensor according to claim 4, wherein
the angle of inclination of said transmission member with respect to the axis of said first rotating shaft of said first driving source is kept constant even if the urging direction of said first spring member is maximally or minimally inclined with respect to the axis of said first rotating shaft of said first driving source following movement of said first movable member in the range of movement of said first movable member in said second direction.

6. The image sensor according to claim 4, wherein
the angle of inclination of the axis of said first pressing member with respect to the axis of said first rotating shaft of said first driving source is rendered substantially identical in the overall range of movement of said first movable member in said second direction.

7. The image sensor according to claim 2, wherein
the angle of inclination of the urging direction of said first spring member with respect to the axis of said first rotating shaft reaches an intermediate level between an angle of maximum inclination and an angle of minimum inclination on an intermediate position of the range of movement of said first movable member in said second direction, and said intermediate position is set on the home position of said first movable portion with respect to said second direction.

8. The image sensor according to claim 2, wherein
said transmission member includes a first mounting portion for mounting a first side of said first spring member, the image sensor further comprises a fixed member including a second mounting portion for mounting a second side of said first spring member, and said first mounting portion of said transmission member is located outside said second mounting portion of said fixed member in said second direction, thereby arranging said first spring member so that the urging direction of said first spring member is inclined on the same side with respect to the axis of said first rotating shaft of said first driving source in the range of movement of said first movable member in said second direction.

9. The image sensor according to claim 8, wherein
said first mounting portion of said transmission member is arranged on a side opposite to said first driving source with respect to said second mounting portion of said fixed member, and said first spring member is arranged between said first mounting portion of said transmission member and said second mounting portion of said fixed member, and so formed as to urge said transmission member toward said first driving source.

10. The image sensor according to claim 1, further comprising:
a second movable member for moving said first movable member in said second direction, and a second driving source for moving said second movable member in said second direction, wherein said first pressing member includes a nut member having a first screw portion on the inner periphery thereof, said first rotating shaft of said first driving source has a second screw portion on the outer periphery thereof, and said first spring member is so arranged that the urging direction of said first spring member is inclined with respect to the axis of said first rotating shaft of said first driving shaft in the range of movement of said first movable member in said second direction following movement of said second movable member in said second direction thereby inclining said transmission member urged by said first spring member with respect to the axis of said first rotating shaft and bringing said transmission member into contact with said nut member engaging with said first rotating shaft, so that said nut member engages with said first rotating shaft while the axis of said nut member is inclined with respect to the axis of said first rotating shaft and said first screw portion of said nut member comes into contact with said second screw portion of said first rotating shaft.

11. The image sensor according to claim 10, wherein
said first screw portion of said nut member and said second screw portion of said first rotating shaft include thread portions each having two surfaces respectively, first said surface of said thread portion of said first screw portion of said nut member is so formed as to engage with first said surface of said thread portion of said second screw portion of said first rotating shaft, and second said surface of said thread portion of said first screw portion of said nut member is so formed as not to engage with second said surface of said thread portion of said second screw portion of said first rotating shaft but to form a clearance.

12. The image sensor according to claim 10, wherein
said transmission member and said nut member are so formed as to come into surface contact with each other in the state inclined with respect to the axis of said first rotating shaft of said first driving source.

13. The image sensor according to claim 12, wherein
said transmission member is rendered slidable on the surface of said nut member while said transmission member and said nut member are in surface contact with each other in the range of movement of said first movable member moves said second direction following movement of said second movable member in said second direction.

14. The image sensor according to claim 13, wherein
said transmission member includes a contact portion, and said contact portion of said transmission member is rendered slidable on the surface of said nut member while said contact portion of said transmission member and the surface of said nut member are in surface contact with each other in the range of movement of said first movable member in said second direction following movement of said second movable member in said second direction.

15. The image sensor according to claim 14, wherein
said contact portion of said transmission member includes a regulation member regulating the range of movement of said transmission member in said second direction.

16. The image sensor according to claim 13, wherein
the angle of inclination of the surface contact portion between said transmission member and said nut member with respect to a direction perpendicular to the axis of said first rotating shaft of said first driving source is rendered substantially identical in the range of movement of said first movable member in said second direction following movement of said second movable member in said second direction.

17. The image sensor according to claim 1, wherein
said first spring member is arranged in a state inclined clockwise in plan view with respect to the axis of said first rotating shaft of said first driving source in the overall range of movement of said first movable member in said second direction.

18. The image sensor according to claim 1, further comprising:
a second driving source having a second rotating shaft for supplying driving force to said transmission member,
a second pressing member so provided as to engage with said second rotating shaft for pressing said second movable member in said second direction, and
a second spring member for urging said second movable member in said second direction on the side of said second pressing member, wherein
the urging direction of said second spring member is rendered substantially parallel to the axis of said second rotating shaft of said second driving source without inclination.

19. The image sensor according to claim 1, so formed that torque acts on said transmission member and said first pressing member about the intersection between the contact portion between said transmission member and said first pressing member and the axis of said first rotating shaft of said first driving source.

* * * * *